UNITED STATES PATENT OFFICE.

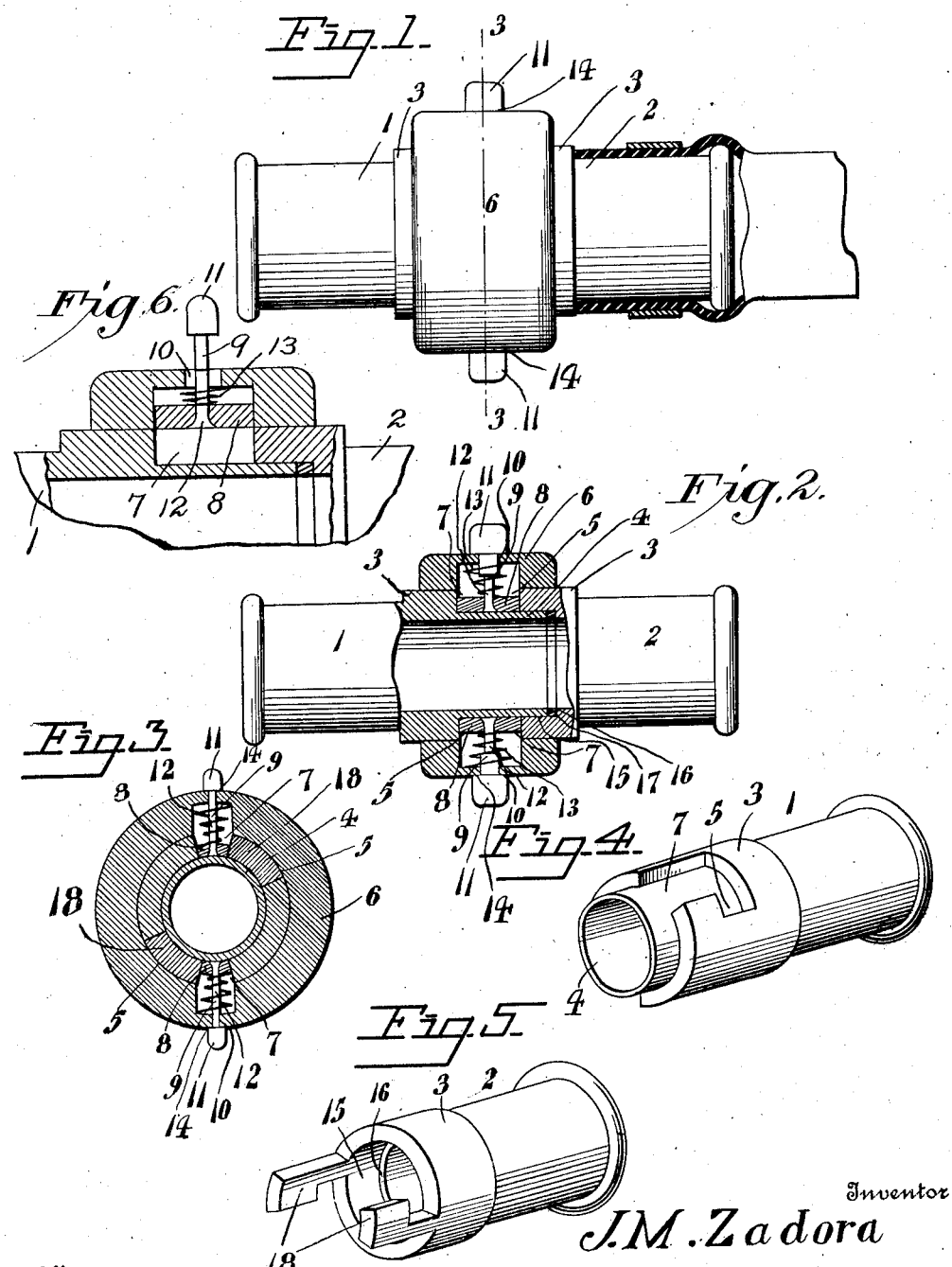

JOSEPH M. ZADORA, OF INTERLOCHEN, MICHIGAN, ASSIGNOR OF ONE-HALF TO ALLEN J. HUSBAND, OF FLINT, MICHIGAN.

COUPLING.

1,362,521.  Specification of Letters Patent.  Patented Dec. 14, 1920.

Application filed June 2, 1919. Serial No. 301,368.

*To all whom it may concern:*

Be it known that I, JOSEPH M. ZADORA, a citizen of the United States, residing at Interlochen, in the county of Grand Traverse and State of Michigan, have invented new and useful Improvements in Couplings, of which the following is a specification.

This invention relates to a coupling by means of which two sections of hose may be quickly connected, or disconnected as the occasion may require without the use of threads or the like upon the coupling.

The primary object of the invention is to provide one of the interfitting coupling members with means for locking the coupling sections in coupled position.

With these and other objects in view the invention consists in the improved construction, novel combination and arrangement of parts, which will be hereinafter more particularly described and pointed out in the claims.

The preferred embodiment of the invention has been illustrated in the accompanying drawing, although no restriction is necessarily made to the precise details of construction therein shown, as changes, alterations and modifications within the scope of the appended claims may be resorted to when desired.

Figure 1 is a side elevation of the coupling members showing the same in coupled position.

Fig. 2 is a view similar to Fig. 1 showing a portion of the coupling broken away.

Fig. 3 is a cross section on the line 3—3 of Fig. 1.

Fig. 4 is a detailed perspective view of the male coupling member showing a portion of the interior thereof.

Fig. 5 is a detailed perspective view of the female coupling member.

Fig. 6 is a detail view of the locking pin construction.

Like characters of reference denote corresponding parts throughout the several views in the drawing.

Referring now to the drawing in detail the numeral 1 designates the male coupling member and the numeral 2 indicates the female member associated therewith.

The male member 1 and the female member 2 which are tubular in configuration are each provided with an enlargement 3 and 3', respectively at one end thereof, the enlargement on the member 1 being reduced to provide a nipple extension 4 said enlargement being further provided at diametrically opposite points with bayonet slots 5. Secured on the enlargement 3 of the male member in any suitable manner is a sleeve 6 which extends beyond the enlargement 3 and terminates at the end of the nipple extension 4, said sleeve being recessed at diametrically opposite points as indicated by the numeral 7.

The recesses 7 communicate with the bayonet slots 5 and have disposed therein locking blocks 8, while swivelly connected with said locking blocks is one end of a pin 9 the remaining end thereof being slidably mounted in apertures 10 in the sleeve which communicate with the recesses 7, said apertures being rectangular in shape to accommodate a similar shaped portion on the pins 9.

That portion of the pins 9 which project beyond the peripheral surface of the sleeve 6 are enlarged to provide heads 11 by which locking blocks 8 may be positioned within the bayonet slots 5 or withdrawn therefrom, while a portion of said pins designated by the numeral 12 which is located between the locking blocks 8 and the rectangular shaped portion of the pin is rounded and has supported thereon coiled springs 13 one end of which bears against the sleeve 6 while the remaining end of said springs exert a tension on the locking blocks 8 which normally serve to project said block into the bayonet slots 5.

When it is desired to position the locking blocks 8 within the recesses 7 against the action of the springs 13 the heads 11 on the pins are grasped and moved outwardly until the rectangular shaped portion of said pins has been withdrawn from the apertures 10 in the sleeves. With the pins in this position, a quarter turn of said pins serves to position a shoulder 14 on said pins formed by the juncture of the rounded portion, and the rectangular shaped portion of the pins, against the outer peripheral surface of the sleeves 6 and maintain the locking blocks positioned with the recesses 7 until manually released therefrom.

The female member 2 has the enlarged portion 3 thereof chambered, as indicated by the numeral 15 to provide a shoulder 16 upon which is disposed a gasket of packing 17 against which the end of the nipple extension 4 is adapted to abut when said members are in coupled position.

Extending from and formed integral with the enlargement 3 of the female member are extensions 18 adapted to be located in the bayonet slots 5 when said members are coupled together. From the above description it is at once apparent that when it is desired to connect two sections of hose to which the coupling members are attached that the locking pins are manually withdrawn and spring projected into the recesses 7 and maintained therein against the action of the springs 13 by means of the shoulders 14 on the pins. With the pins in the above mentioned position the male coupling member is inserted in the female coupling member with the extension on the female member located in the bayonet slots 5 in the male member.

A slight turn is now imparted to the male coupling member by means of the pins to firmly interlock said members and the pins 9, turned to a position which will enable the springs 13 to position the locking blocks 8 within the bayonet slots and behind the extensions on the female members. With reference now to the various views in the drawing it will be clearly seen that the coupling members are securely interlocked and that a tight joint therebetween is maintained by the packing 17.

It will of course be understood that when it is desired to uncouple the members the above described operation for coupling the same is reversed which may be accomplished in an expedient manner whenever desirable.

From the foregoing statement taken in connection with the accompanying drawing it is at once apparent that a hose coupling has been provided, which is simple in construction, inexpensive of manufacture and highly efficient in use.

Having described the invention what is claimed is:

1. In a hose coupling, interfitting members, one of said members having bayonet slots, the remaining member having extensions for location within said slots, a sleeve upon the first mentioned member, provided with recesses communicating with the slots in said sleeves, pins loosely mounted in said sleeves, locking blocks loosely connected to said pins, and springs located within said recesses and encircling the pins adapted to normally move said blocks within the bayonet slots, said pins being adapted to be manually withdrawn to disengage said locking blocks, and means for holding said pins in such withdrawn position.

2. In a hose coupling, interfitting members, one of said members having bayonet slots, the remaining member having extensions for location within said slots, a sleeve upon the first mentioned member having recesses communicating with said slots and elongated apertures communicating with said recesses, locking blocks, pins rotatably connected with the locking blocks and mounted for sliding movement in said apertures, springs encircling said pins and normally serving to move the locking blocks in one direction, and shoulders formed on said pins adapted for contact with the sleeves to act in opposition to the above mentioned springs.

In testimony whereof I affix my signature.

JOSEPH M. ZADORA.